(12) United States Patent
Yonezawa et al.

(10) Patent No.: US 9,559,593 B2
(45) Date of Patent: Jan. 31, 2017

(54) SYNCHRONOUS RECTIFICATION CONVERTER AND CONTROL METHOD OF SYNCHRONOUS RECTIFICATION CONVERTER

(71) Applicant: FUJITSU LIMITED, Kawasaki-shi, Kanagawa (JP)

(72) Inventors: Yu Yonezawa, Sagamihara (JP); Yoshiyasu Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/587,785

(22) Filed: Dec. 31, 2014

(65) Prior Publication Data

US 2015/0236590 A1    Aug. 20, 2015

(30) Foreign Application Priority Data

Feb. 18, 2014    (JP) ................................. 2014-028549

(51) Int. Cl.
    *H02M 3/158*    (2006.01)
    *H02M 1/08*    (2006.01)
    *H02M 1/00*    (2006.01)

(52) U.S. Cl.
    CPC ............. *H02M 3/1588* (2013.01); *H02M 1/08* (2013.01); *H02M 2001/0032* (2013.01); *Y02B 70/1466* (2013.01); *Y02B 70/16* (2013.01)

(58) Field of Classification Search
    CPC .... H02M 3/156; H02M 3/158; H02M 3/1588; H02M 3/35507; H02M 3/285; H02M 3/355; H02M 2001/0032; H02M 1/08; H02M 70/1466; Y02B 70/1466; Y02B 70/16; G05F 3/08
    See application file for complete search history.

(56) References Cited

U.S. PATENT DOCUMENTS

| | | | | |
|---|---|---|---|---|
| 5,999,420 A | * | 12/1999 | Aonuma | ........... H02M 3/33592 363/127 |
| 8,471,630 B2 | * | 6/2013 | Lin | ..................... H03F 3/45071 330/144 |
| 2005/0285579 A1 | | 12/2005 | Yasukouchi et al. | |

(Continued)

FOREIGN PATENT DOCUMENTS

JP    2006-014482 A    1/2006

*Primary Examiner* — Jessica Han
*Assistant Examiner* — Demetries A Gibson
(74) *Attorney, Agent, or Firm* — Arent Fox LLP

(57) ABSTRACT

A synchronous rectification converter includes: a first switching element coupled between a inductor and an input terminal; a second switching element coupled between the inductor and the input terminal; a capacitive element coupled between the other end of the inductor and the other end of the input terminal; a control circuit detects voltages of the inductor and the capacitive element; a current inversion detection circuit detects inversion of a direction in which a current supplied from the second switching element to the inductor flows and outputs an inversion signal; a delay circuit delays the inversion signal and outputs a delay inversion signal; a synchronous rectification reset circuit that changes the control signal; a load detector detects reduction of an output current supplied from a connection node of the inductor and the capacitive element; and a delay control circuit generates a delay control signal.

3 Claims, 15 Drawing Sheets

(56) References Cited

U.S. PATENT DOCUMENTS

| | | | |
|---|---|---|---|
| 2006/0043943 A1* | 3/2006 | Huang | H02M 3/1584 323/222 |
| 2010/0060334 A1* | 3/2010 | Abe | H03L 7/087 327/158 |
| 2012/0242300 A1* | 9/2012 | Ueno | H02M 3/156 323/234 |
| 2013/0119968 A1* | 5/2013 | Manabe | H02M 3/158 323/318 |
| 2014/0125302 A1* | 5/2014 | Yang | H02M 3/1563 323/282 |

* cited by examiner

FIG. 5A
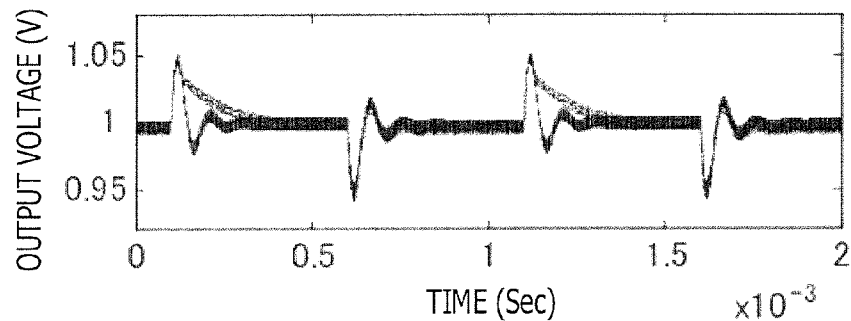
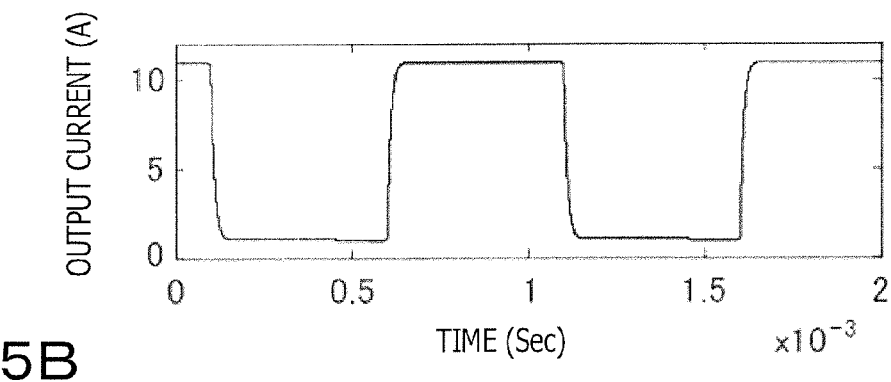
FIG. 5B
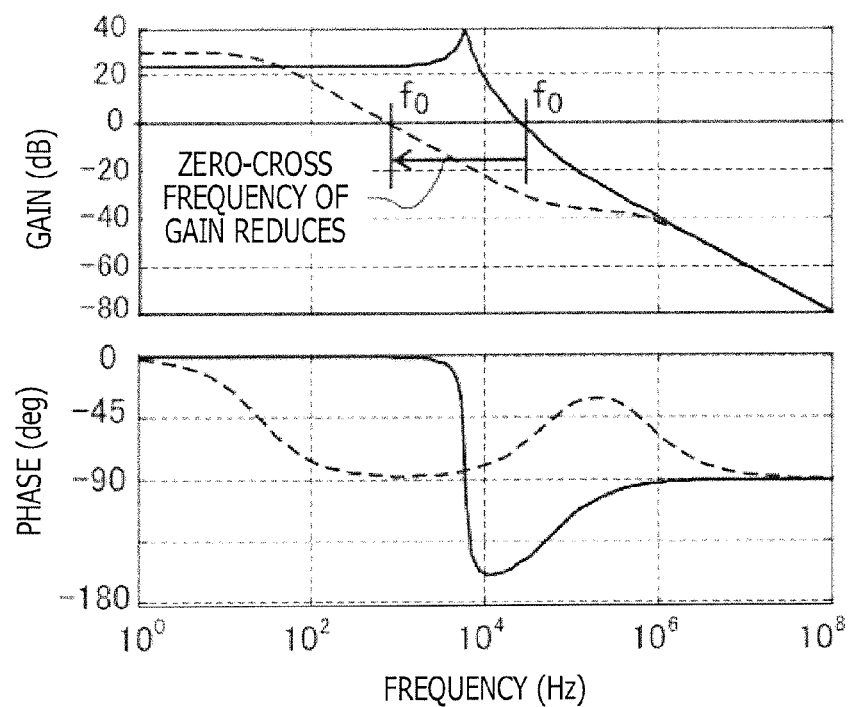

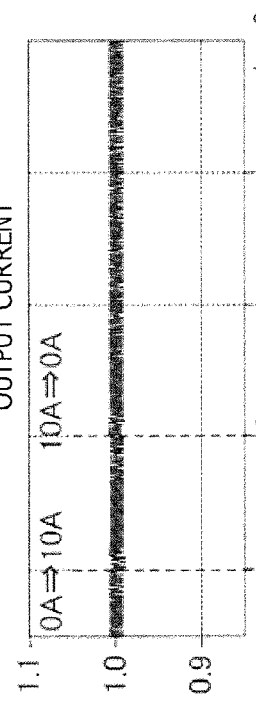
FIG. 7A CONTINUOUS MODE
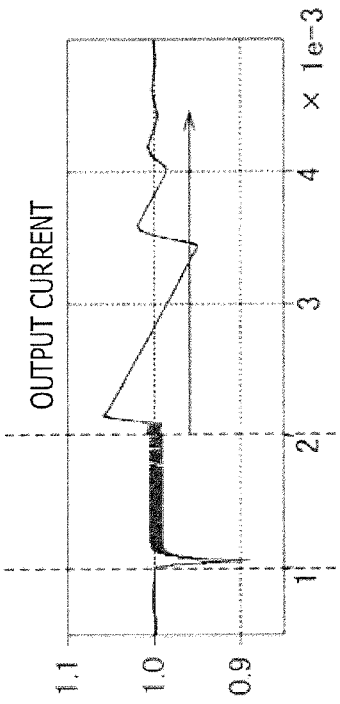
FIG. 7B DISCONTINUOUS MODE
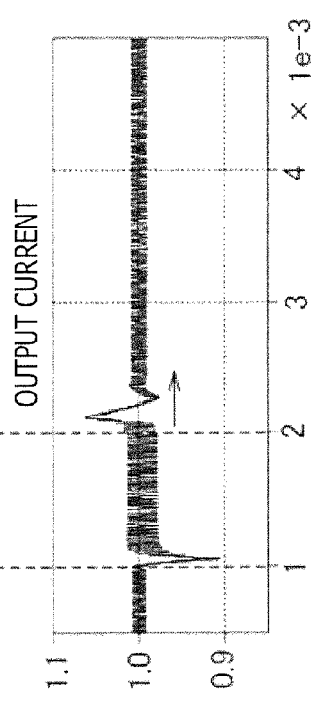
FIG. 7C METHOD OF DOCUMENT 1
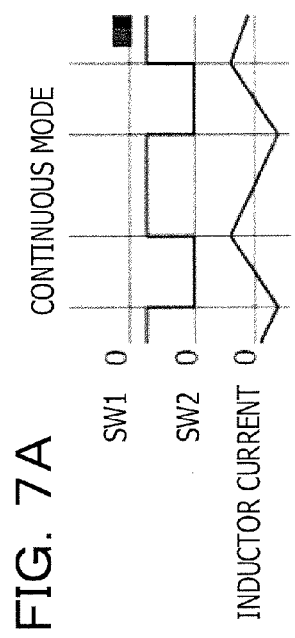
FIG. 7D
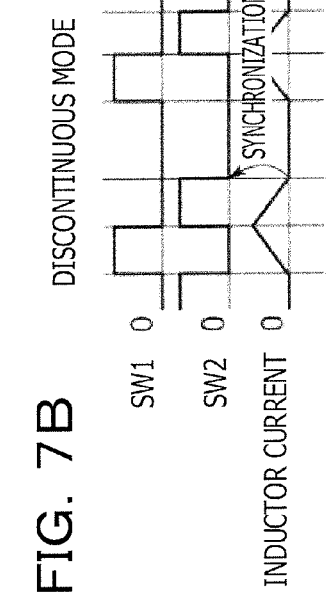
FIG. 7E
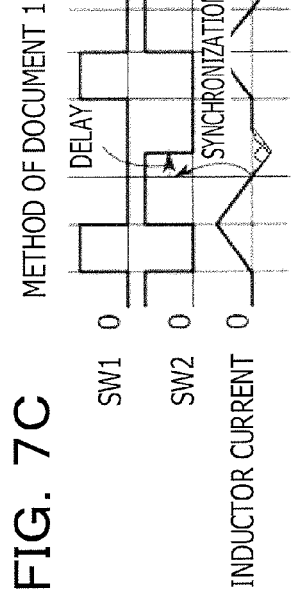
FIG. 7F

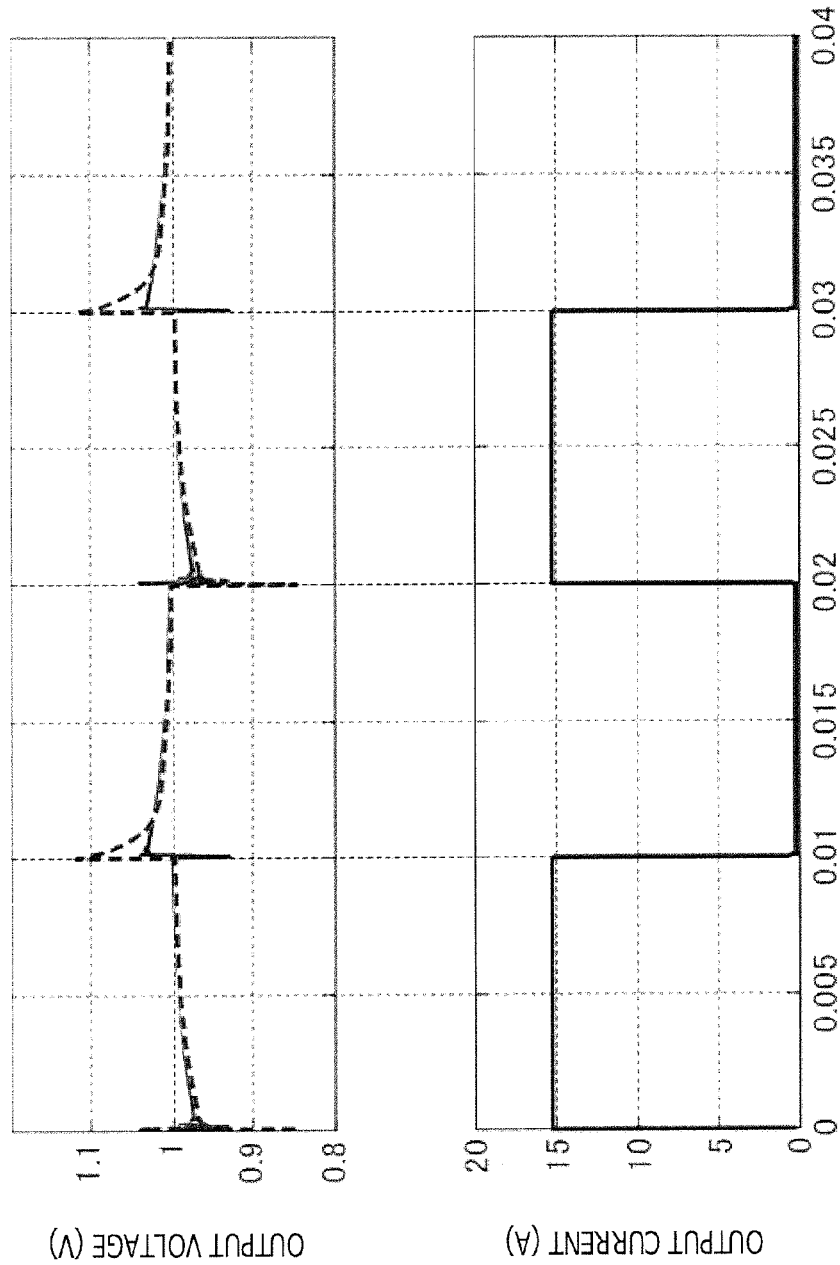

SYNCHRONOUS RECTIFICATION CONVERTER AND CONTROL METHOD OF SYNCHRONOUS RECTIFICATION CONVERTER

CROSS-REFERENCE TO RELATED APPLICATION

This application is based upon and claims the benefit of priority of the prior Japanese Patent Application No. 2014-028549, filed on Feb. 18, 2014, the entire contents of which are incorporated herein by reference.

FIELD

The embodiments discussed herein are related to a synchronous rectification converter and a control method of a synchronous rectification converter.

BACKGROUND

DC-DC converters are used in various fields. For example, a mobile electronic device uses a battery, such as a battery cell, as a power source, and battery power is discharged with time in accordance with power consumption due to operation of the device, so that the output voltage of the battery reduces. In order to maintain the voltage value of the power source of the device at a certain level relative to such change of the battery voltage with time, the voltage of a power supply source is stabilized by a DC-DC converter.

In a DC-DC converter used in a mobile electronic device, it is desired that power loss is minimized in order to extend an operation time of the device before a battery is to be recharged or replaced, and specifically, highly efficient power conversion is desired. In general, such a DC-DC converter is realized by a synchronous rectification converter.

A synchronous rectification converter includes an inductor (a choke coil), a first (main) switching element, a second (synchronous rectification) switching element, a capacitive element (capacitor), two input terminals, two output terminals, and a control circuit. A direct-current voltage is supplied to the two input terminals from an input power source. The two output terminals are coupled to a load RL. A second one of the two output terminals is coupled to a second one of the two input terminals. The first switching element is coupled between one end of the inductor and a first one of the input terminals. The second switching element is coupled between the one end of the inductor and the second one of the input terminals. The capacitive element is coupled between the other end of the inductor and the second one of the input terminals. The first switching element is made conductive to supply a current to the inductor, and the first switching element is turned off to stop current supply to the inductor. The inductor operates so as to continuously cause a current to flow, and thus, when the second switching element is made conductive, a current is supplied from the second switching element. Due to this operation, the capacitive element is charged via the inductor.

As described above, the first switching element and the second switching element are alternately made conductive (turned on) on a predetermined cycle, and a charge voltage of the capacitive element changes in accordance with a time which it takes to make the first switching element and the second switching element conductive. Such control is referred to as a continuous mode, and control which causes a conduction time to change is referred to as pulse width modulation (PWM) control. When a load is large and an output current (a power supply amount) is large, the charge voltage of the capacitive element reduces and, when the load is small and the output current (the power supply amount) is small, the charge voltage of the capacitive element increases. Therefore, the charge voltage of the capacitive element is detected and the time which it takes to make the first switching element and the second switching element conductive is controlled in accordance with the charge voltage of the capacitive element.

Each of the first switching element and the second switching element is realized by a MOSFET, or the like, has a smaller conduction loss than that of a diode, or the like, which is used as a rectifying element in an asynchronous converter, and is capable of performing accurate control in accordance with the state of a power source, thus allowing reduction in power loss.

It is desired to increase the efficiency of a synchronous rectification converter used for the above-described device in a wide load region ranging from a heavy load with a large power supply amount to a light load with a small power supply amount. In this case, there is a problem in which, at light load, a current flows back in the first and second switching elements, and therefore, power conversion efficiency greatly reduces at light load, as compared to the power conversion efficiency at heavy load.

In order to solve this problem, a technique was proposed in which, when it is detected that a current flowing in the second switching element is zero, that is, when current inversion is detected, control is performed such that the second switching element is turned off, thereby not allowing reverse flow of a current. This control method is referred to as diode emulation (discontinuous mode control), and the efficiency at light load is improved by discontinuous mode control.

As another point, in a synchronous rectification converter, when a load abruptly changes and thus an output voltage (the voltage of a capacitive element) changes, it is desired that the output voltage returns to a predetermined output voltage in a short time. This is referred to load abrupt change responsiveness. In discontinuous mode control, a zero-cross frequency of a gain of a converter reduces and responsiveness is deteriorated, and thus, restoration of the output voltage after abrupt change of a load is delayed. That is, there is a problem in which, in discontinuous mode control, load abrupt change responsiveness is low.

In order to solve the above-described problems, a technique was proposed in which the second switching element is not turned off immediately after current inversion is detected, but the second switching element is turned off in a delayed state after current inversion is detected. Thus, inversion current is caused to flow in the inductor, thereby reducing an excessive flow of energy of the inductor to the load at light load. Using this control method, an operation between a continuous mode and a discontinuous mode is performed, so that energy accumulated in the inductor is allowed to be discharged relatively early, and therefore, responsiveness is improved. However, there is a problem in which efficiency reduces at light load.

The following is a reference document.
[Document 1] Japanese Laid-open Patent Publication No. 2006-014482.

SUMMARY

According to an aspect of the invention, a synchronous rectification converter includes: an inductor; a first switching element coupled between one end of the inductor and one end of an input terminal; a second switching element coupled between the one end of the inductor and the other end of the input terminal; a capacitive element coupled between the other end of the inductor and the other end of the input terminal; a control circuit that detects voltages of the inductor and the capacitive element and outputs a control signal that makes the first switching element and the second switching element alternately conductive, based on the detected voltages; a current inversion detection circuit that detects inversion of a direction in which a current supplied from the second switching element to the inductor flows and outputs an inversion signal; a delay circuit that delays the inversion signal and outputs a delay inversion signal; a synchronous rectification reset circuit that changes the control signal in accordance with the delay inversion signal such that the second switching element is turned off; a load detector that detects reduction of an output current supplied from a connection node of the inductor and the capacitive element to a load and outputs an output current reduction signal; and a delay control circuit that generates a delay control signal a value of which gradually reduces from a time when the output current reduction detection signal is generated, wherein the delay circuit changes a delay amount of the delay inversion signal in accordance with the value of the delay control signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1A is a circuit diagram thereof, and FIG. 1B is a time chart illustrating an operation thereof;

FIG. 3A is a circuit diagram thereof, and FIG. 3B is a time chart illustrating an operation thereof;

FIG. 4A is a graph illustrating the circuit efficiency, and FIG. 4B is a graph illustrating the circuit loss;

FIGS. 5A and 5B are diagrams illustrating the load abrupt change responsiveness of each of the continuous mode control synchronous rectification converter of FIGS. 1A and 1B and the discontinuous mode control synchronous rectification converter of FIGS. 3A and 3B, FIG. 5A is a diagram illustrating change of an output voltage when an output current abruptly changes, and FIG. 5B is a diagram illustrating frequency characteristics of a gain and a phase;

FIG. 6A is a circuit diagram thereof, and FIG. 6B is a time chart illustrating an operation thereof;

FIGS. 7A to 7F are diagrams illustrating comparison among continuous mode control, discontinuous (intermittent) mode control, and control described in the document 1;

FIG. 8A is a graph illustrating the circuit efficiency, and FIG. 8B is a graph illustrating the circuit loss;

FIG. 11 is a diagram illustrating results of simulation of change of an output voltage in the synchronous rectification converter according to the first embodiment when an output current fluctuates (at the time of load abrupt change), the solid line indicates characteristics of the synchronous rectification converter according to the first embodiment, and the dashed line indicates characteristics when discontinuous mode control is performed;

FIG. 12A is a graph illustrating the circuit efficiency, and FIG. 12B is a graph illustrating the circuit loss;

DESCRIPTION OF EMBODIMENTS

Before describing embodiments, a typical synchronous rectification converter will be described.

Figure 1B:
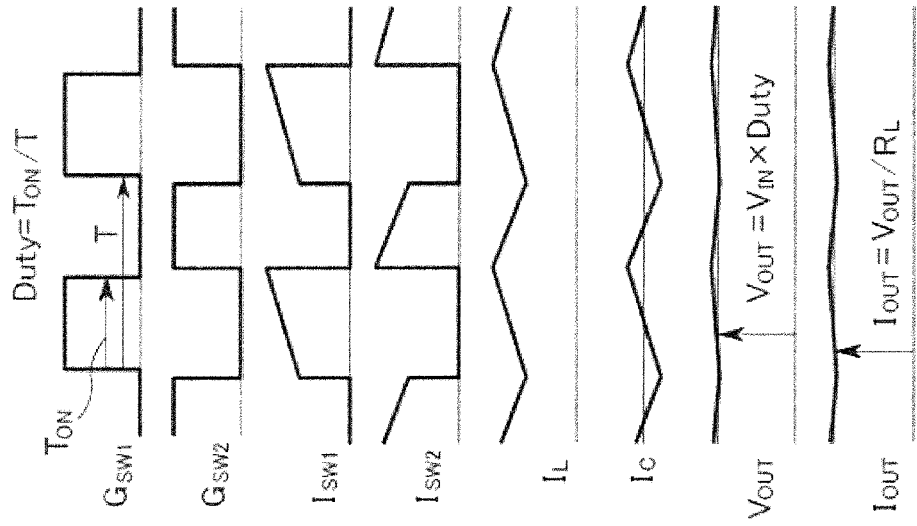
FIGS. 1A and 1B are diagrams illustrating a typical synchronous rectification buck converter.
Figure 1A:
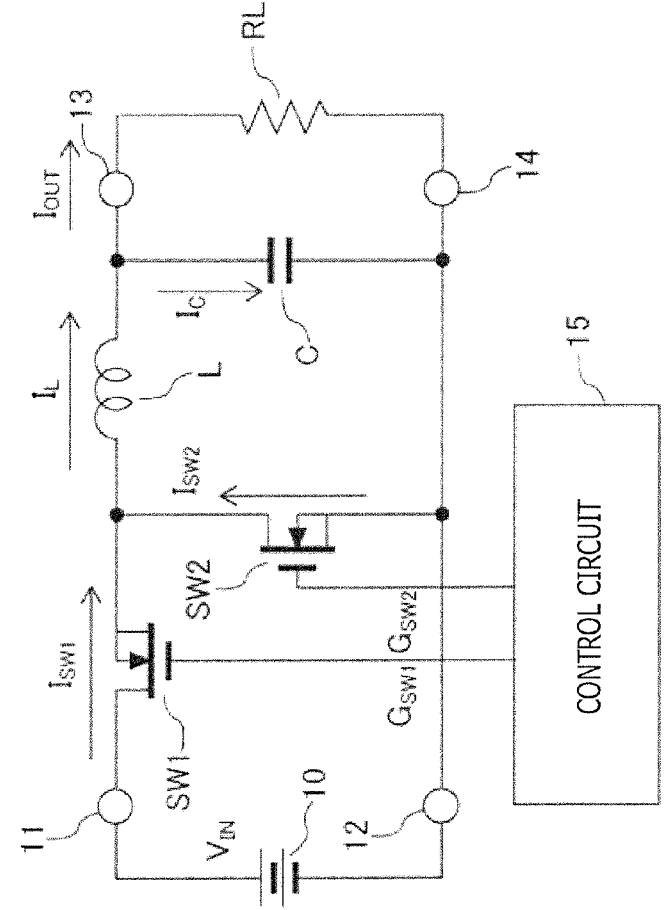

FIGS. 1A and 1B are diagrams illustrating a typical synchronous rectification buck converter, FIG. 1A is a circuit diagram thereof, and FIG. 1B is a time chart illustrating an operation thereof.

The synchronous rectification converter includes an inductor (a choke coil) L, a first switching element SW1, a second switching element SW2, a capacitive element C, input terminals 11 and 12, output terminals 13 and 14, and a control circuit 15. A direct-current power source voltage $V_{IN}$ is supplied to the input terminals 11 and 12 from an input power source (a battery cell) 10. The output terminals 13 and 14 are coupled to a load RL. The input terminal 12 and the output terminal 14 are coupled to each other.

SW1 is coupled between one end of the inductor L and the input terminal 11. SW2 is coupled between the one end of the inductor L and the input terminal 12. Thus, SW1 and SW2 are coupled in series between the input terminals 11 and 12, and the one end of the inductor L is coupled to a connection node of the input terminals 11 and 12. The capacitive element C is coupled between the other end (the output terminal 13) of the inductor L and the input terminal 12 (the output terminal 14). The control circuit 15 outputs a control signal $G_{SW1}$ that controls conduction and blocking (on and off) of SW1 and a control signal $G_{SW2}$ that controls on and off of SW2, as illustrated in FIG. 1B.

Each of SW1 and SW2 is realized by an N-type MOSFET, is made conductive (is turned on) when the corresponding one of $G_{SW1}$ and $G_{SW2}$ is high (H) relative to the source electrode potential of the corresponding one of SW1 and SW2, and is turned off when the corresponding one of $G_{SW1}$ and $G_{SW2}$ is low (L) relative to the source electrode potential of the corresponding one of SW1 and SW2. $G_{SW1}$ repeatedly changes between H and L in a cycle T, and the duty ratio (Duty) of a period $T_{ON}$ when $G_{SW1}$ changes to H and SW1 is turned on to the cycle T is expressed by $T_{ON}/T$. Since, when $G_{SW1}$ and $G_{SW2}$ change to H at the same time, a large current flows between the input terminals 11 and 12, $G_{SW1}$ and $G_{SW2}$ are controlled so as to alternately change to H, not to change to H at the same time. However, immediately after one of $G_{SW1}$ and $G_{SW2}$ falls to L, the other one of $G_{SW1}$ and $G_{SW2}$ rises to H, and thus, SW1 and SW2 are turned on substantially in succession. Therefore, this control is referred to as continuous mode control.

When SW1 is made conductive, a current $I_{SW1}$ is supplied to the inductor L, and a current $I_L$ flows in the inductor L. When SW1 becomes conductive, the current $I_{SW1}$ starts flowing and then gradually increases. Accordingly, the current $I_L$ and a current $I_C$ flowing into the capacitive element C gradually increase, the capacitive element C is charged, and an output voltage $V_{OUT}$ (the voltage of the capacitive element C) changes. When SW1 is turned off, the current $I_{SW1}$ becomes zero, but the inductor L operates so as to cause the current $I_L$ to continuously flow due to a back electromotive force, and therefore, when SW2 is made conductive, a current $I_{SW2}$ is supplied from SW2 and the current $I_L$ continuously flows in the inductor L, while the current gradually reduces. The output voltage $V_{OUT}$ is a value equal to a value obtained by multiplying the duty ratio on a power source voltage $V_{IN}$ and an output current $I_{OUT}$ is a value equal to a value obtained by dividing $V_{IN}$ by a load $R_L$.

The load $R_L$ fluctuates, the output voltage $V_{OUT}$ reduces when the load $R_L$ is large and the output current (a power supply amount) $I_{OUT}$ is large, and the output voltage $V_{OUT}$ increases when the load $R_L$ is small and the output current $I_{OUT}$ is small. Thus, the control circuit 15 detects the output voltage $V_{OUT}$ (the charge voltage of the capacitor) and controls the duty ratio such that a desired output voltage $V_{OUT}$ is achieved.

It is desired to increase the efficiency of a synchronous rectification converter in a wide load region ranging from a heavy load with a large power supply amount to a light load with a small power supply amount. The continuous mode control synchronous rectification converter of FIG. 1 has a problem in which a current flows back in SW1 and SW2, at light load, and therefore, reduction in power conversion efficiency is large at light load, as compared to reduction in power conversion efficiency at heavy load.

Figure 2:
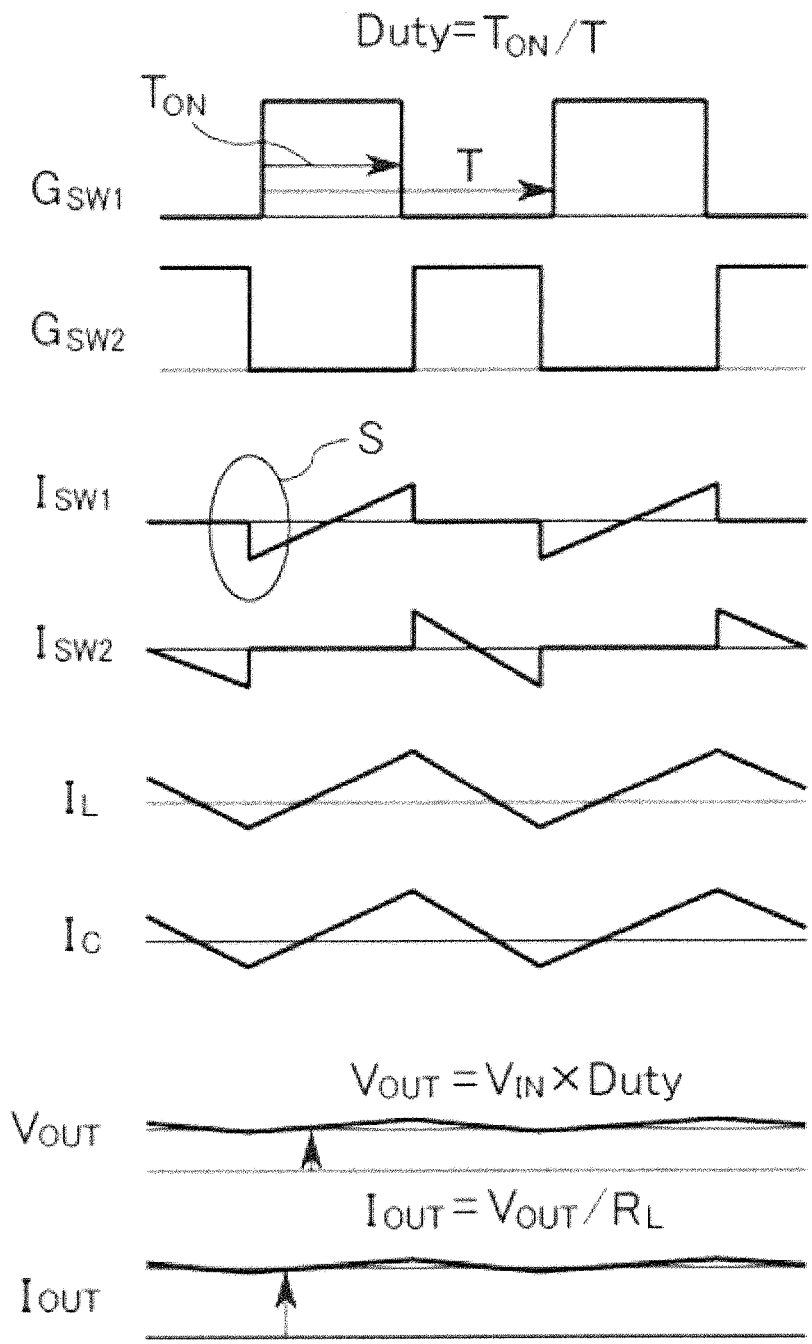
FIG. 2 is a time chart illustrating an operation of the continuous mode control synchronous rectification converter of FIG. 1 at light load.

FIG. 2 is a time chart illustrating an operation of the continuous mode control synchronous rectification converter of FIG. 1 at light load.

Because the continuous mode control synchronous rectification converter is operated at light load, when SW2 is turned off and SW1 is turned on, $I_{SW1}$ becomes negative, as illustrated in a part indicated by a ring shape mark S, and a current flows back in SW1. This reverse flow of a current causes reduction in efficiency, and a loss increases.

In order to solve this problem, a technique was proposed in which, when it is detected that a current flowing in the second switching element is zero, that is, when current inversion is detected, control is performed such that the second switching element is turned off, thereby not allowing reverse flow of a current. This control method is referred to as diode emulation (discontinuous mode control), and the efficiency at light load is improved by discontinuous mode control.

Figure 3A:
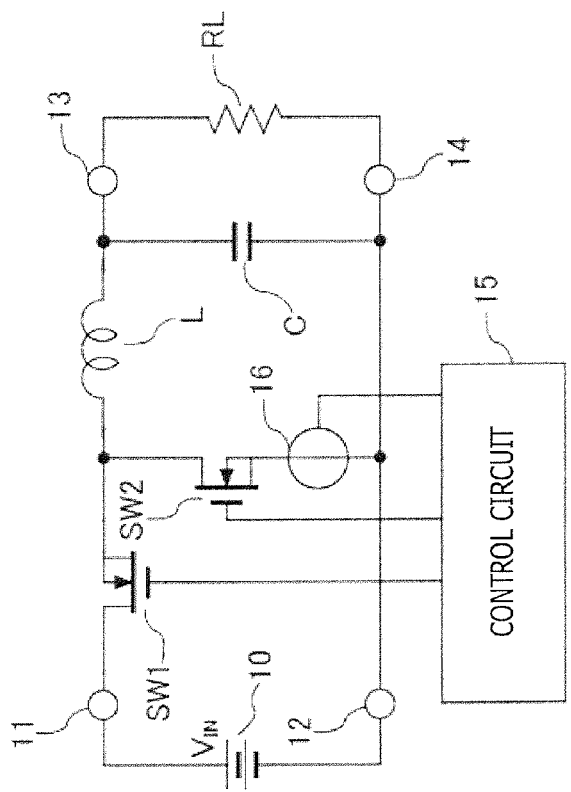
FIGS. 3A and 3B are diagrams illustrating a discontinuous mode control synchronous rectification converter.
Figure 3B:
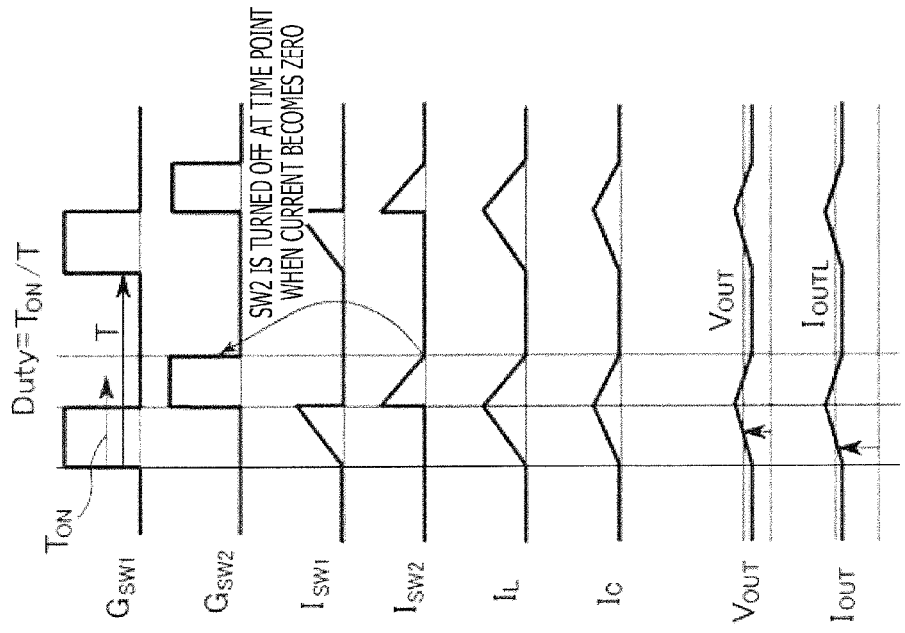

FIGS. 3A and 3B are diagrams illustrating a discontinuous mode control synchronous rectification converter, FIG. 3A is a circuit diagram thereof, and FIG. 3B is a time chart illustrating an operation thereof.

As illustrated in FIG. 3A, the discontinuous mode control synchronous rectification converter is obtained by providing a sensor 16 that detects a current flowing in SW2 in the continuous mode control synchronous rectification converter of FIG. 1A. The sensor 16 is configured to detect reverse flow of a current, and may be configured to detect reverse flow from a voltage. As illustrated in FIG. 2, when SW2 is turned on, $I_{SW2}$ once increases to a high level, starts reducing thereafter, and reduces to a level below zero while SW2 is on because the discontinuous mode control synchronous rectification converter is operated at light load. Then, as illustrated in FIG. 3B, when it is detected that $I_{SW2}$ is zero, the control circuit 15 performs control such that SW2 is turned off. Thus, during a period from the time when SW2 is turned off to the time when SW1 is turned on next, SW1 and SW2 are turned off, and current supply to the inductor L is suspended, so that the current supply is discontinuous. As described above, the synchronous rectification converter that performs discontinuous mode control performs control such that reverse flow of a current does not occur at light load, and therefore, the efficiency is improved.

Figure 4A:
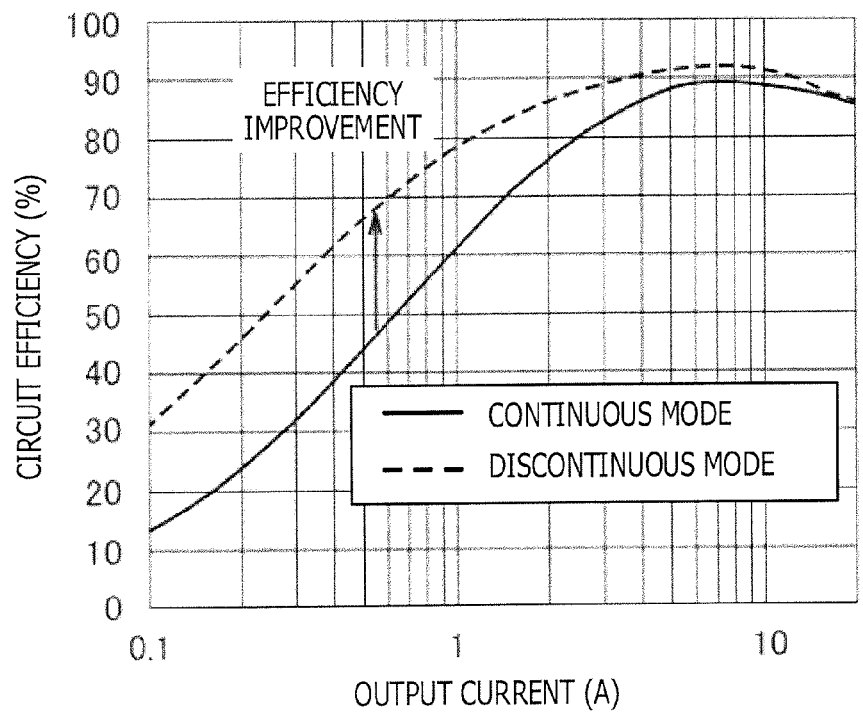
FIGS. 4A and 4B are graphs illustrating the circuit efficiency and circuit loss of each of the continuous mode control synchronous rectification converter of FIGS. 1A and 1B and the discontinuous mode control synchronous rectification converter of FIGS. 3A and 3B in accordance with an output current.
Figure 4B:
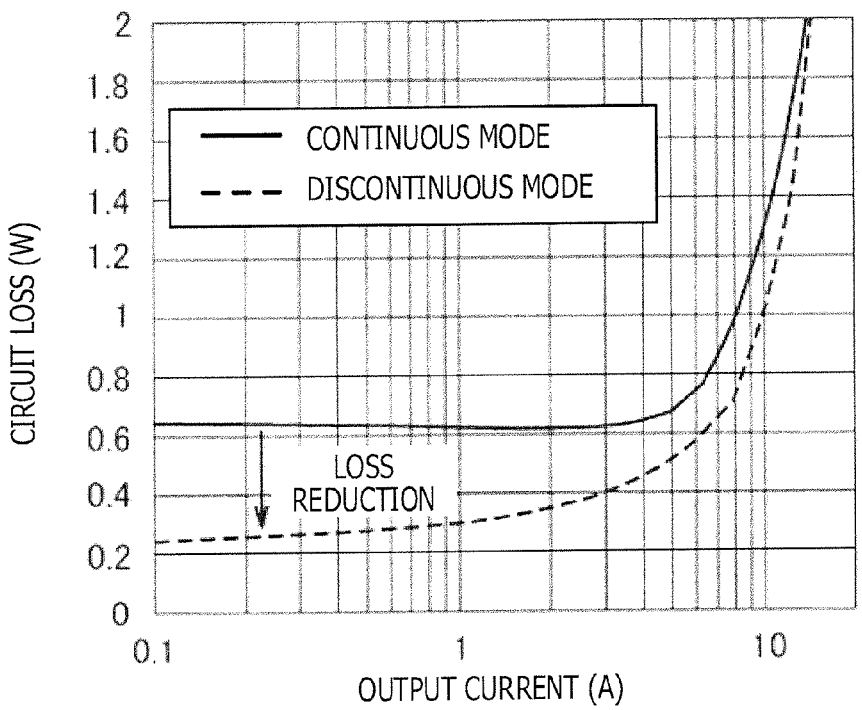

FIGS. 4A and 4B are graphs illustrating the circuit efficiency and circuit loss of each of the continuous mode control synchronous rectification converter of FIGS. 1A and 1B and the discontinuous mode control synchronous rectification converter of FIGS. 3A and 3B in accordance with an output current, FIG. 4A is a graph illustrating the circuit efficiency, and FIG. 4B is a graph illustrating the circuit loss. In FIGS. 4A and 4B, the solid line indicates characteristics of the continuous mode control synchronous rectification converter of FIGS. 1A and 1B, and the dashed line indicates characteristics of the discontinuous mode control synchronous rectification converter of FIGS. 3A and 3B.

It is understood from FIGS. 4A and 4B that, for the discontinuous mode control synchronous rectification converter, the circuit efficiency is improved and the circuit loss is reduced, specifically, when the output current is low (at light load), as compared to the continuous mode control synchronous rectification converter.

In a synchronous rectification converter, when a load abruptly changes and thus an output voltage (the voltage of a capacitive element) changes, it is desired that the output voltage returns to a predetermined output voltage in a short time. This is referred to load abrupt change responsiveness.

FIGS. 5A and 5B are diagrams illustrating load abrupt change responsiveness of each of the continuous mode control synchronous rectification converter of FIGS. 1A and 1B and the discontinuous mode control synchronous rectification converter of FIGS. 3A and 3B, FIG. 5A is a diagram illustrating change of an output voltage when an output current abruptly changes, and FIG. 5B is a diagram illustrating frequency characteristics of a gain and a phase. In FIG. 5B, the solid line indicates characteristics of the continuous mode control synchronous rectification converter of FIGS. 1A and 1B, and the dashed line indicates characteristics of the discontinuous mode control synchronous rectification converter of FIGS. 3A and 3B.

As illustrated in the lower portion of FIG. 5A, when the output current abruptly increases, there is almost no difference in change of the output voltage between continuous mode control and discontinuous mode control. However, it is understood that, when the output current abruptly reduces, it takes a long time for the output voltage to converge to a predetermined voltage in discontinuous mode control, whereas the output voltage converges to a predetermined voltage in a short time, while oscillating, in continuous mode control.

As illustrated in FIG. 5B, in continuous mode control, the gain is substantially the same around 20 dB until the frequency reaches around $10^4$ Hz, and gradually reduces at $10^4$ Hz and higher frequencies. In contrast, in discontinuous mode control, the gain is substantially the same around 20 dB until the frequency reaches around $10^2$ Hz, and gradually reduces at $10^2$ Hz and higher frequencies. Therefore, it is understood that the zero-cross frequency at which the gain is zero dB is around $10^3$ Hz and thus is lowered in discontinuous mode control, whereas the zero-cross frequency is $2.5 \times 10^4$ Hz in continuous mode control. Also, the phase changes from zero to negative 90 degrees, while oscillating, from $10^0$ Hz to around $10^7$ Hz in discontinuous mode control, whereas the phase abruptly changes from zero to negative 150 degrees around $10^4$ Hz and then converges to negative 90 degrees in continuous mode control.

As described above, in discontinuous mode control, the zero-cross frequency of the gain of the converter reduces and responsiveness is deteriorated, and therefore, restoration of the output voltage after abrupt change of the load is delayed. That is, there is a problem in which load abrupt change responsiveness is low in discontinuous mode control. In discontinuous mode control, an efficiency improvement effect and load abrupt change responsiveness are in the trade-off relationship and it is difficult to improve both of the efficiency and the load abrupt change responsiveness at the same time.

Figures 6A, 6B:
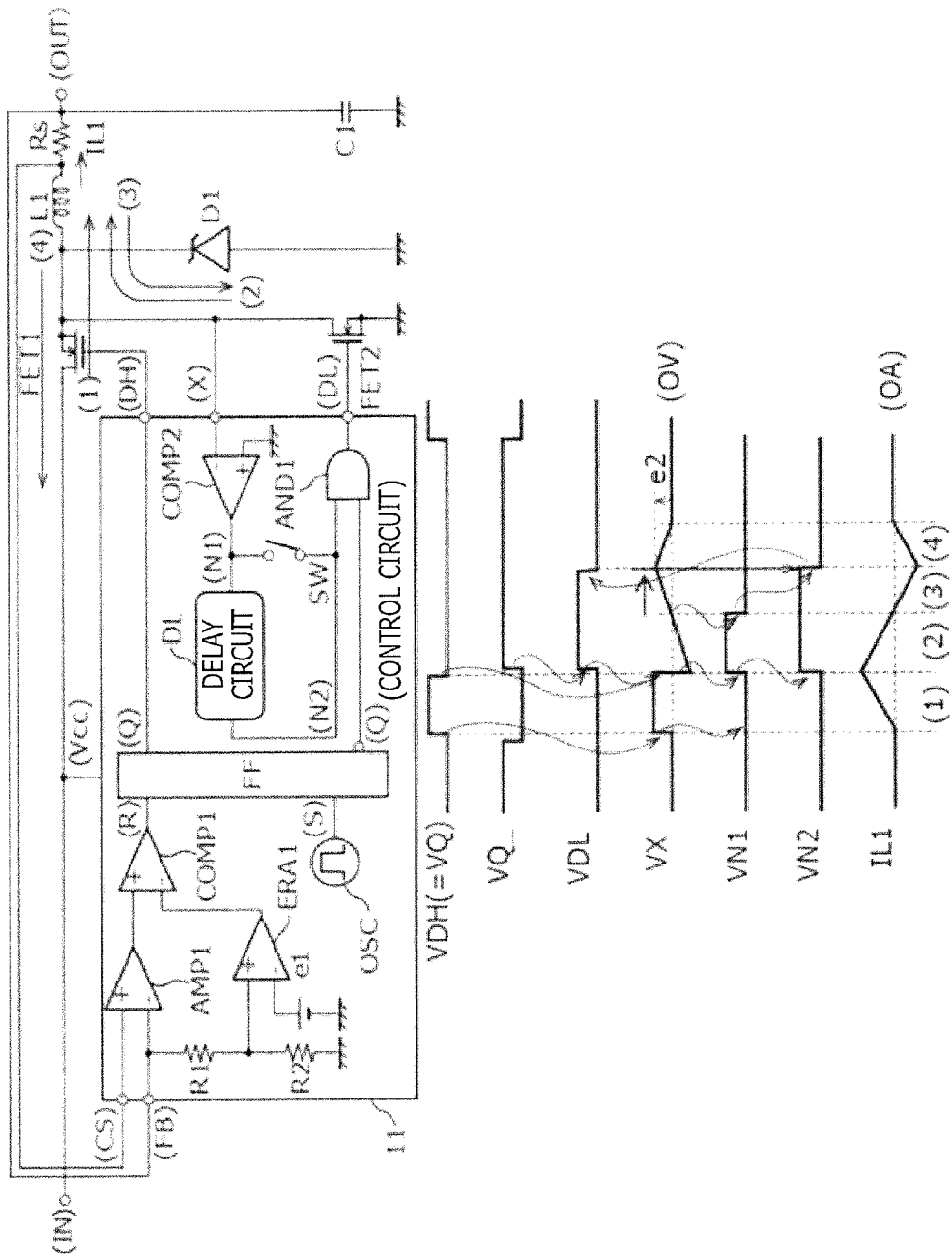
FIGS. 6A and 6B are diagrams illustrating a synchronous rectification converter described in the document 1.

FIGS. 6A and 6B are diagrams illustrating a synchronous rectification converter described in the document 1, FIG. 6A is a circuit diagram thereof, and FIG. 6B is a time chart illustrating an operation thereof.

The synchronous rectification converter of FIG. 6A detects a current flowing from an inductor L1 to a capacitive element C1 or from C1 to L1 at a sense resistor Rs, and turns on and off a first switching element FET1 and a second switching element FET2 in accordance with a detected current value. Thus, control is performed such that the voltage (the output voltage) of C1 is at a predetermined voltage value. Note that an on signal /Q of FET2 is a reverse phase signal of an on signal Q of FET1. Furthermore, a comparator COMP2 compares the voltage of a drain of FET2 to the zero level, and detects reverse flow of a current flowing in FET2. When the current does not flow back, an output N1 of COMP2 is high (H) and is directly input to AND1, and the on signal /Q of FET2 is applied to a gate of FET2. When reverse flow occurs, the output N1 of COMP2 changes to be low (L) but, in this case, the output N1 is input to AND1 via a delay circuit DL, and therefore, FET2 is turned off in a delayed fashion after reverse flow occurs. Thus, an inversion current is caused to flow in the inductor to control excessive flow of energy of the inductor to a load at light load.

FIGS. 7A to 7F are diagrams illustrating comparison among continuous mode control, discontinuous (intermittent) mode control, and control described in the document 1. FIGS. 7A to 7C are time charts illustrating operations of continuous mode control, discontinuous mode control, and control described in the document 1. FIGS. 7D to 7F illustrate change of an output voltage when an output current changed from 0 A to 10 A or from 10 A to 0 A, and two dashed lines indicates the times when the output voltage changed.

As illustrated in FIG. 7A, in continuous mode control, SW1 and SW2 are alternately turned on, and a current flowing in the inductor L increases when SW1 is on and reduces when SW2 is on. As illustrated in FIG. 7B, in discontinuous mode control, when the current of the inductor L starts flowing back, that is, when an inductor current becomes zero, SW2 is turned off. As illustrated in FIG. 7C, in the control described in the document 1, similar to discontinuous mode control, after it is detected that the current of the inductor L started flowing back, SW2 is turned off in a delayed fashion.

As illustrated in FIG. 7D, in continuous mode control, even when the output current changes, the output voltage hardly fluctuates. As illustrated in FIG. 7E, in discontinuous mode control, when the output current changes, fluctuation occurs and, specifically, when the current is turned off, that is, when the current changes from 10 A to 0 A, the fluctuation is large, and it takes a long time for the output voltage to converge to a predetermined voltage. As illustrated in FIG. 7F, in the control described in the document 1, when the output current changes, the output voltage fluctuates, but the output voltage converges in a shorter time than that in discontinuous mode.

Figure 8A:
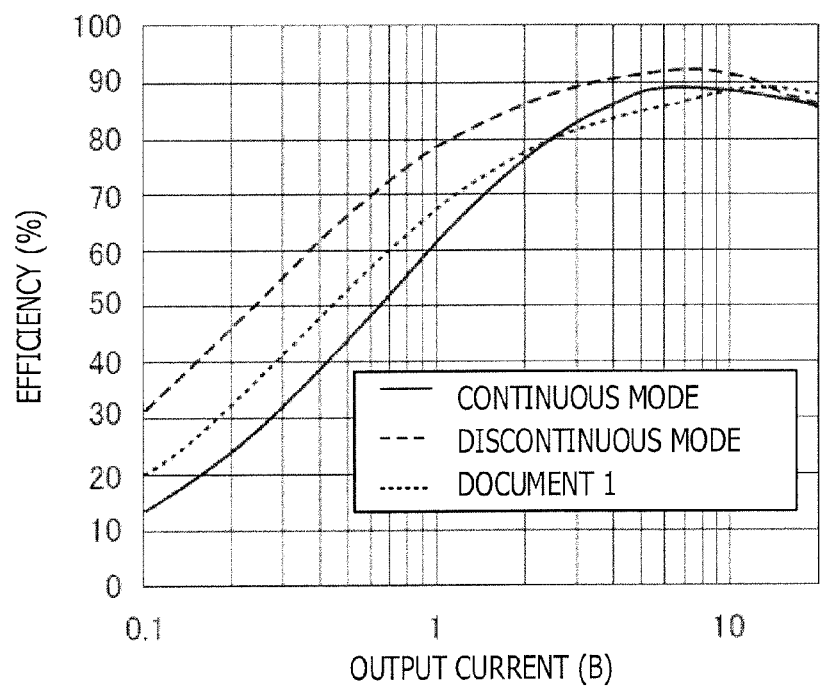
FIGS. 8A and 8B are graphs illustrating the circuit efficiency and circuit loss of each of the continuous mode control synchronous rectification converter, the discontinuous mode control synchronous rectification converter, and the synchronous rectification converter described in the document 1.
Figure 8B:
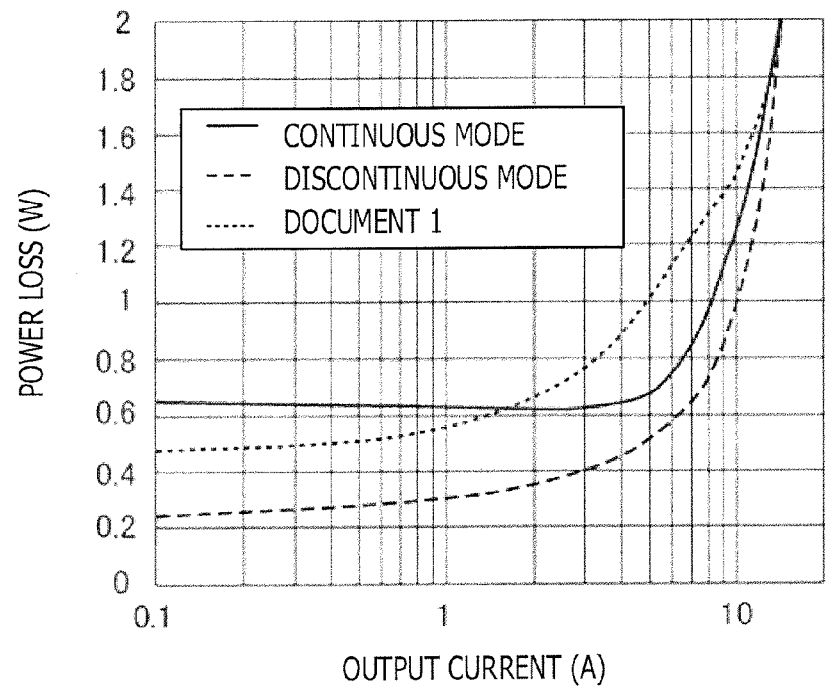

FIGS. 8A and 8B are graphs illustrating the circuit efficiency and circuit loss of each of the continuous mode control synchronous rectification converter, the discontinuous mode control synchronous rectification converter, and the synchronous rectification converter described in the document 1, FIG. 8A is a graph illustrating the circuit efficiency, and FIG. 8B is a graph illustrating the circuit loss. In FIGS. 8A and 8B, the solid line indicates characteristics of a synchronous rectification converter which performs continuous mode control, the dashed line indicates characteristics of a synchronous rectification converter which performs discontinuous mode control, and the dotted line indicates characteristics of the synchronous rectification converter described in the document 1.

It is understood from FIGS. 8A and 8B that each of the circuit efficiency and circuit loss of the synchronous rectification converter described in the document 1 is between those of continuous mode control and discontinuous mode control when the output current is small (at light load). Using a control method described in the document 1, an operation between a continuous mode and a discontinuous mode is performed and energy accumulated in the inductor is discharged relatively early, so that responsiveness is improved. However, the control method described in the document 1 has a problem in which the efficiency at light load reduces. As described above, also in the control described in the document 1, the efficiency improvement effect and the load abrupt change responsiveness are in the trade-off relationship.

Figure 9:
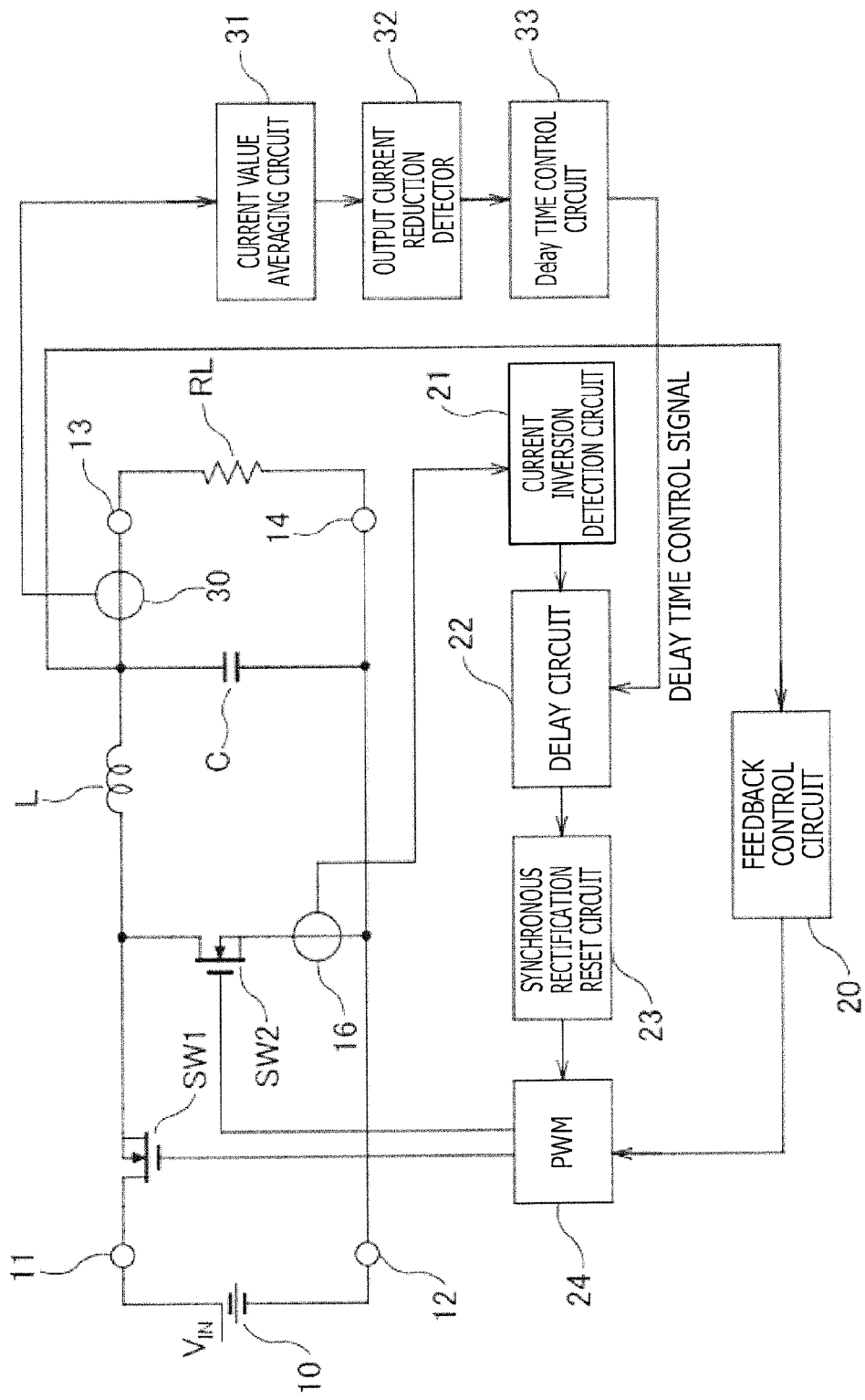
FIG. 9 is a diagram illustrating a circuit configuration of a synchronous rectification converter according to a first embodiment.

FIG. 9 is a diagram illustrating a circuit configuration of a synchronous rectification converter according to the first embodiment.

The synchronous rectification converter according to the first embodiment includes an inductor L, a first (main) switching element SW1, a second (synchronous rectification) switching element SW2, a capacitive element C, input terminals 11 and 12, output terminals 13 and 14, and a control circuit 16. The synchronous rectification converter according to the first embodiment further includes a feedback control circuit 20 and a PWM signal generation circuit 24. Note that, although not illustrated, a voltage sensor that detects the voltage of the capacitive element C is provided, and the feedback control circuit 20 corresponds to the control circuit 15 and controls a duty, that is, a PWM signal, in accordance with the voltage of the capacitive element C. The above-described elements are same as those of the synchronous rectification converter that performs discontinuous mode control illustrated in FIG. 3A, and are not particularly limited thereto, as long as they realize similar functions.

The synchronous rectification converter according to the first embodiment further includes a current inversion detection circuit 21, a delay circuit 22, and a synchronous rectification reset circuit 23. The above-described elements correspond to the elements described in the document 1. For example, the current inversion detection circuit 21 corresponds to COMP2, the delay circuit 22 corresponds to the delay circuit DL and the switch SW, and the synchronous rectification reset circuit 23 corresponds to AND1. However, the current inversion detection circuit 21, the delay circuit 22, and the synchronous rectification reset circuit 23 according to the first embodiment are not limited thereto.

The synchronous rectification converter according to the first embodiment further includes an output current (load current) sensor 30, a current value averaging circuit 31, an output current reduction detector 32, and a delay time control circuit 33. The delay circuit 22 is configured such that a delay time changes in accordance with a delay time control signal sent from the delay time control circuit 33. In other words, the synchronous rectification converter according to the first embodiment has a configuration obtained by adding the output current sensor 30, the current value averaging circuit 31, the output current reduction detector 32, and the delay time control circuit 33 to the synchronous rectification converter described in the document 1 and modifying the delay circuit 22.

In the synchronous rectification converter according to the first embodiment, when an output current (a load current) increases and then reduces to a lower level than a threshold, the output current sensor 30, the current value averaging circuit 31, and the output current reduction detector 32 detect the reduction of the output current to start the delay time control circuit 33. The delay time control circuit 33 outputs a delay time control signal that performs control so as to increase a delay time in the delay circuit 22 immediately after being started, and thereafter, gradually reduce the delay time in the delay circuit 22 with time so that the delay time is eventually close to zero.

Figure 10:
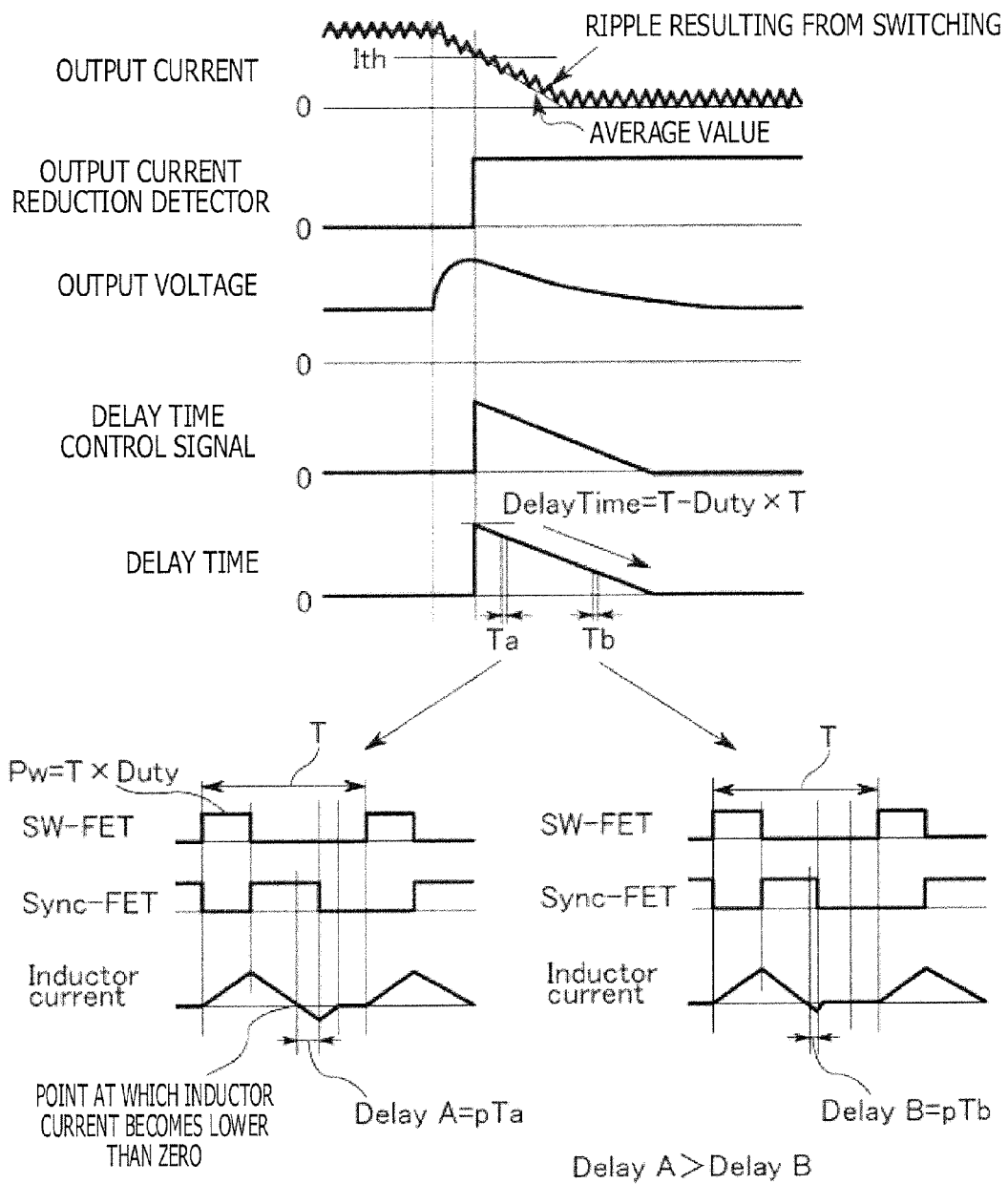
FIG. 10 is a time chart illustrating an operation related to delay time control in the synchronous rectification converter according to the first embodiment.

FIG. 10 is a time chart illustrating an operation related to delay time control in the synchronous rectification converter according to the first embodiment.

Since the output current has a ripple resulting from switching, the current value averaging circuit 31 generates a signal averaged by removing a high-frequency component of an output signal detected by the output current sensor 30. When the averaged output current increases and then reduces to a level equal to or lower than a threshold Ith, the output of the output current reduction detector 32 changes to be H, and the output current reduction detector 32 outputs a reduction detection signal. The output voltage temporarily raises in accordance with reduction of the output current, for example, as illustrated in FIG. 10.

In response to the reduction detection signal, the delay time control circuit 33 generates a delay time control signal that gradually reduces after rising to a high level, and supplies the delay time control signal to the delay circuit 22. The delay circuit 22 changes the delay amount of a signal that turns off SW2 and is output by the current inversion detection circuit 21 in accordance with the level of the delay time control signal. For example, a delay time (Delay Time) at the time of a rise of the delay time control signal is a value T−Duty×T obtained by deducting an on time duty (Duty)×T of SW1 from a cycle T. In FIG. 10, at a time point indicated by Ta, a delay (Delay) A is p×Ta (where p is a constant) and, at a time point indicated by Tb, a delay (Delay) A is p×Tb. Ta>Tb, and thus, Delay A>Delay B.

FIG. 11 is a diagram illustrating results of simulation of change of an output voltage in the synchronous rectification converter according to the first embodiment when an output current fluctuates (at the time of load abrupt change), the solid line indicates characteristics of the synchronous rectification converter according to the first embodiment, and the dashed line indicates characteristics when discontinuous mode control is performed.

It is understood that, in the first embodiment, as compared to discontinuous mode control, when the load abruptly changes, the output voltage fluctuates but returns to a target voltage quickly.

Figure 12A:
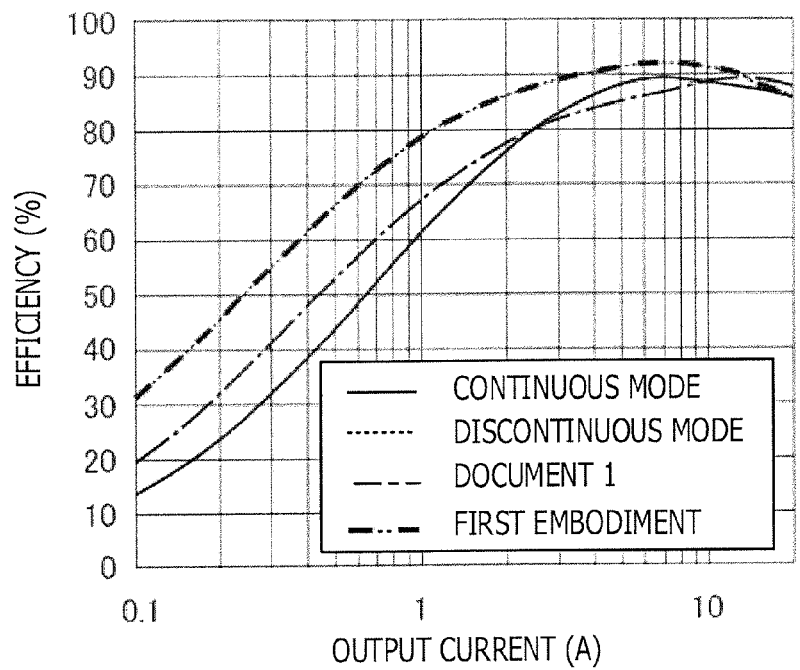
FIGS. 12A and 12B are graphs illustrating the circuit efficiency and circuit loss of the synchronous rectification converter in accordance with an output current for a case where continuous mode control is performed, a case where discontinuous mode control is performed, a case where the control described in the document 1 is performed, and a case where control according to the first embodiment is performed.
Figure 12B:
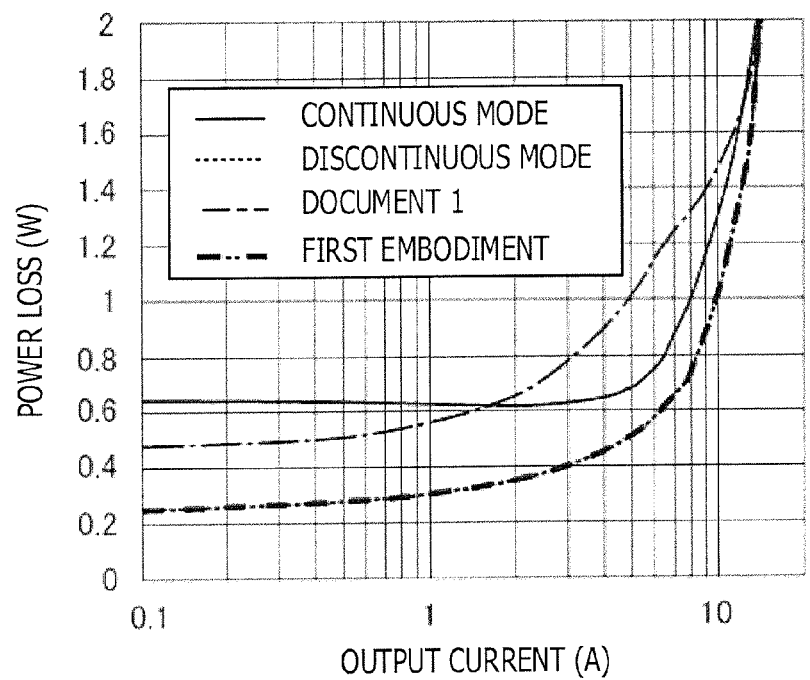

FIGS. 12A and 12B are graphs illustrating the circuit efficiency and circuit loss of the synchronous rectification converter in accordance with an output current for a case where continuous mode control is performed, a case where discontinuous mode control is performed, a case where the control described in the document 1 is performed, and a case where control according to the first embodiment is performed, FIG. 12A is a graph illustrating the circuit efficiency, and FIG. 12B is a graph illustrating the circuit loss. In FIGS. 12A and 12B, the solid line indicates characteristics of a synchronous rectification converter which performs continuous mode control, the dotted line indicates characteristics of a synchronous rectification converter which performs discontinuous mode control, the alternate long and short dash line indicates characteristics of the synchronous rectification converter described in the document 1, and the heavy dashed line indicates characteristics of the synchronous rectification converter according to the first embodiment.

Based on FIGS. 12A and 12B, the circuit efficiency and circuit loss of the synchronous rectification converter according to the first embodiment are the same as those in discontinuous mode control, and are good, as compared to continuous mode control and the control described in the document 1. Furthermore, as illustrated in FIG. 11, the load abrupt change responsiveness, which is a problem that arises in discontinuous mode control in the first embodiment, is improved, as compared to the case where discontinuous mode control is performed.

Figure 13:
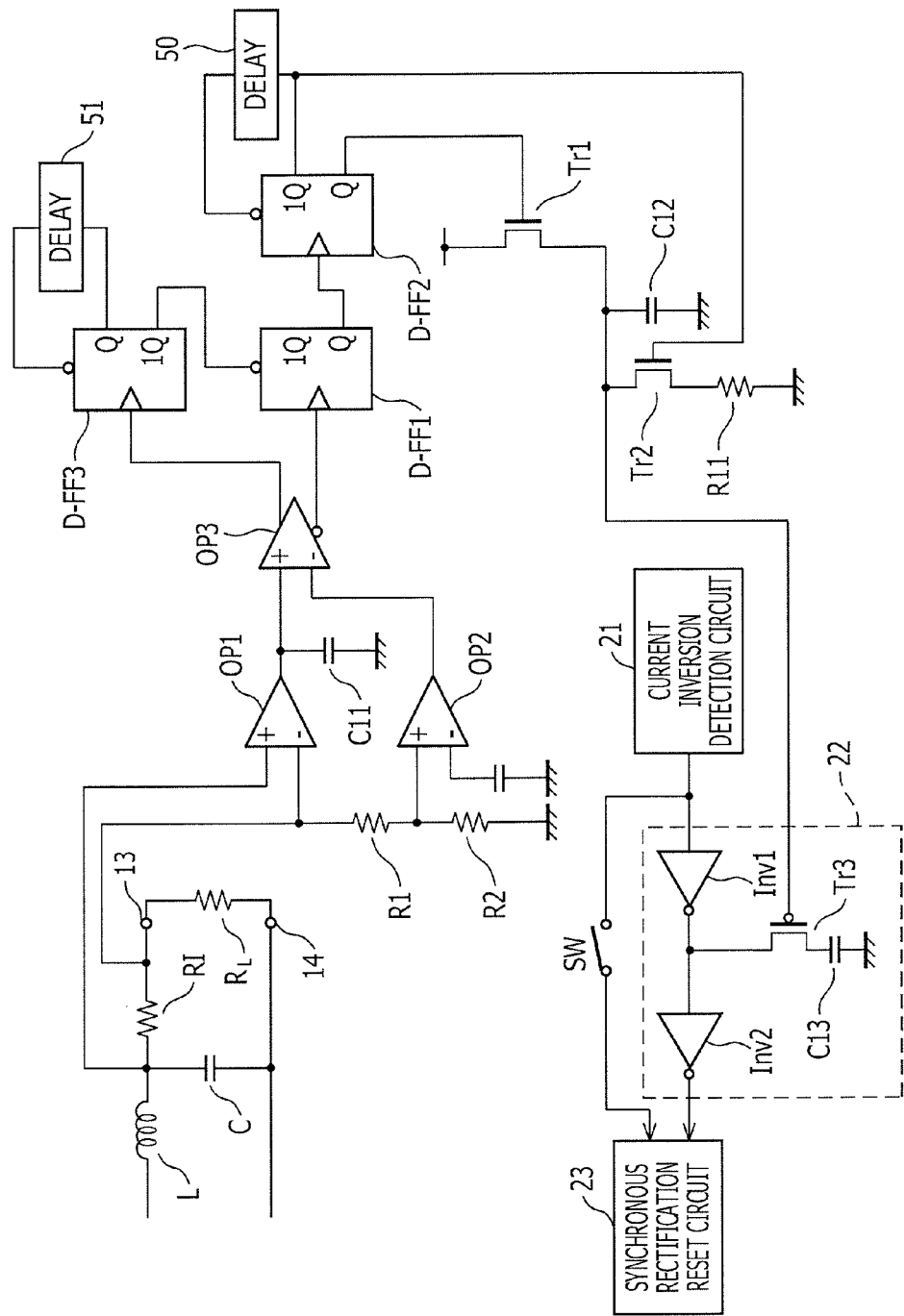
FIG. 13 is a diagram illustrating a specific circuit example of a newly added portion and a portion that is to be modified in the synchronous rectification converter according to the first embodiment.

FIG. 13 is a diagram illustrating a specific circuit example of a newly added portion and a portion that is to be modified in the synchronous rectification converter according to the first embodiment.

The sensor 30 that detects an output current is formed by a resistor RI coupled between one end of the capacitive element C and the output terminal 13, an amplifier OP1 that detects voltages at both ends of RI, and resistors R1 and R2. The sensor 30 is a circuit similar to a circuit that detects the current of the inductor described in the document 1.

The current value averaging circuit 31 is formed by a capacitive element C11 coupled to an output of OP1. The capacitive element C11 functions as a lowpass filter and removes a ripple.

The output current reduction detector 32 is formed by the resistors R1 and R2, an amplifier OP2, and a comparator OP3. The comparator OP3 compares the voltage (an averaged signal corresponding to an output current signal) of C11 to a threshold voltage output by OP2, causes, when the voltage of C11 is equal to or lower than the threshold voltage, an output to change, and outputs an output reduction detection signal.

The delay time control circuit 33 includes D-FF1, D-FF2, D-FF3, delay circuits 50 and 51, transistors Tr1 and Tr2, a capacitive element C12, and a resistor R11. D-FF1 causes an output to rise in accordance with the output reduction detection signal output sent from OP3, and accordingly, D-FF2 generates a one shot pulse. In D-FF2, /Q is input to a reset terminal via the delay circuit 50, and D-FF2 returns to a processing state, and therefore, the pulse width of the one shot pulse is determined by the delay amount of the delay circuit 50. When the output current excesses the threshold again, D-FF3 and the delay circuit 51 perform an operation of resetting D-FF1. Note that the operation of resetting D-FF1 may be performed by a signal generated by comparing the output current to another threshold voltage, without using the output of OP3.

When the one shot pulse is generated, Tr1 is made conductive and Tr2 is turned off. Thus, C12 is put in a state of being charged to a high voltage. When the one shot pulse is finished, Tr1 is turned off and Tr2 is made conductive, so that electric charges charged to C12 are discharged via Tr2 and the resistor R11 and the voltage of C1 gradually reduces. The voltage of C12 is a delay time control signal.

The delay circuit 22 is formed by two inverters Inv1 and Inv2, a p-type depletion transistor Tr3, and a capacitive element C13. In Tr3, the delay time control signal is applied to a gate thereof, and Tr3 functions as a resistor that has a high resistance value when the voltage of the delay time control signal is high, and has a low resistance value when the voltage of the delay time control signal is low. In other words, when the voltage of the delay time control signal is high, the load of the output of Inv1 is large and the delay time of the delay circuit 22 is long and, when the voltage of the delay time control signal is low, the load of the output of Inv1 is small and the delay time of the delay circuit 22 is short. Thus, delay is performed in accordance with the voltage of the delay time control signal. Note that, when output current reduction is not detected, the delay time control signal is zero and the delay time of the delay circuit 22 is long.

In the first embodiment, continuous mode control is performed at heavy load and, in a light load state where the load is reduced, the continuous mode control is switched to discontinuous mode control. It is desirable that a threshold based on which the output current reduction detector 32 determines reduction of the output current is set to be a threshold at which whether or not the current of the inductor L reverses is switched. A method for calculating the threshold will be described below.

A change amount $\Delta I_L$ of a current $I_L$ of the inductor L is expressed by the following expression.

$$\Delta I_L = V_{IN} * \text{Duty}/(L * f_{SW})$$

Because it is when an output current $I_{OUT}$ is smaller than $\Delta I_L$ that continuous mode is switched to discontinuous mode, the threshold voltage is set such that output current reduction is determined when $I_{OUT}$ is smaller than $\Delta I_L = V_{IN} * \text{Duty}/(L * f_{SW})$.

It is desirable that the delay time in the delay circuit 22 and the delay time control signal are set such that voltage fluctuation after change of the load current is the smallest. As a method for setting the delay time and the delay time control signal, a method in which voltage fluctuation is checked by simulation and a method in which voltage fluctuation is checked by actual measurement and the delay time is set such that the voltage fluctuation is minimum may be used.

Figure 14:
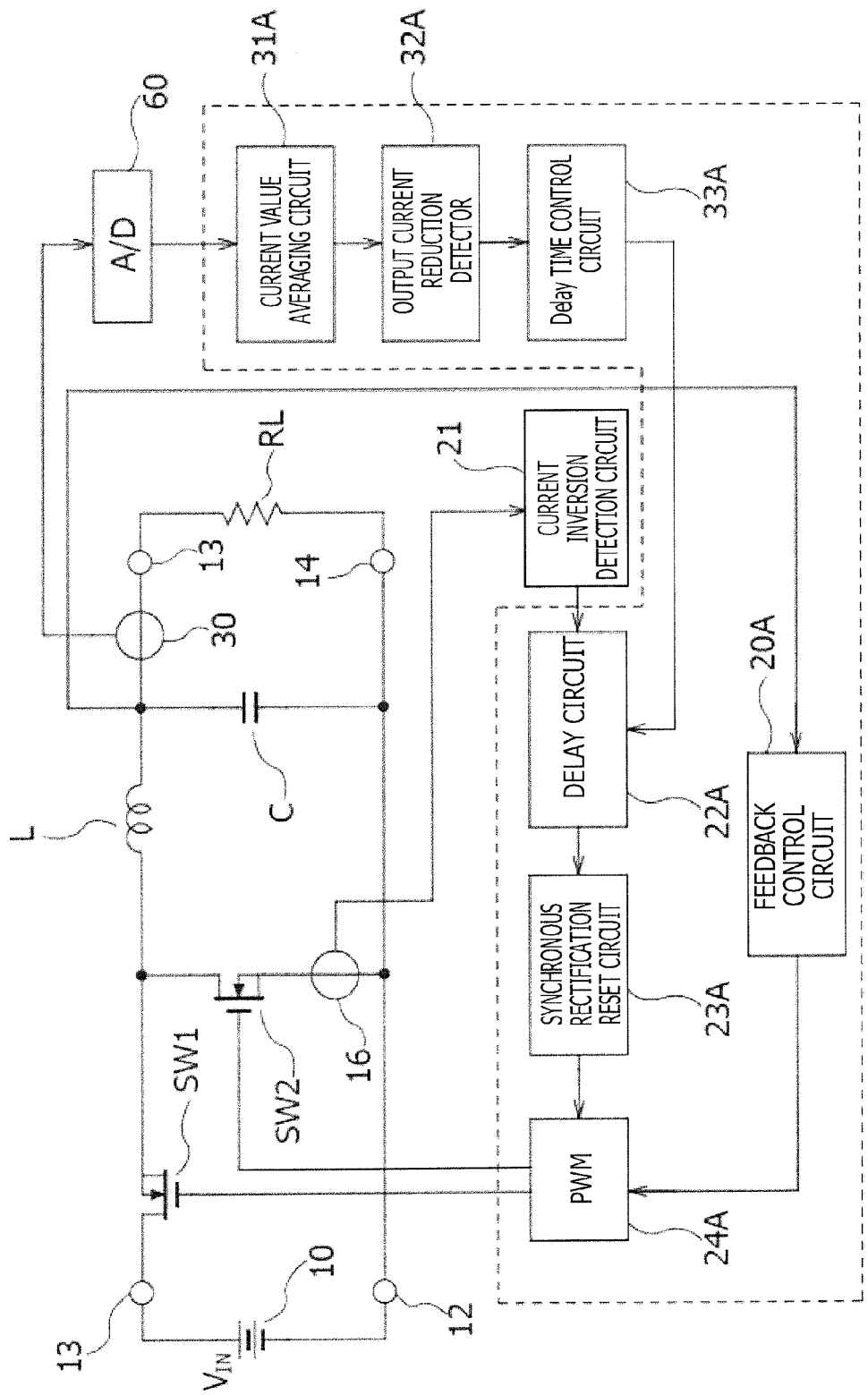
FIG. 14 is a diagram illustrating a configuration of a synchronous rectification converter according to a second embodiment.

FIG. 14 is a diagram illustrating a configuration of a synchronous rectification converter according to a second embodiment.

In the synchronous rectification converter according to the first embodiment, each member is realized by an analog circuit, but a member related to control may be realized by digital processing. In the second embodiment, an A/D converter 60 that converts an analog output of the current sensor 30 to a digital signal is provided. Furthermore, in the second embodiment, a feedback control circuit 20A, a delay circuit 22A, a synchronous rectification reset circuit 23A, a PWM signal generation circuit 24A, a current value averaging circuit 31A, an output current reduction detector 32A, and a delay time control circuit 33A are realized by digital processing circuits. In FIG. 14, a portion surrounded by the dashed line is a portion realized by digital processing, and, for example, is realized by a digital signal processor (DSP), or the like.

Figure 15:
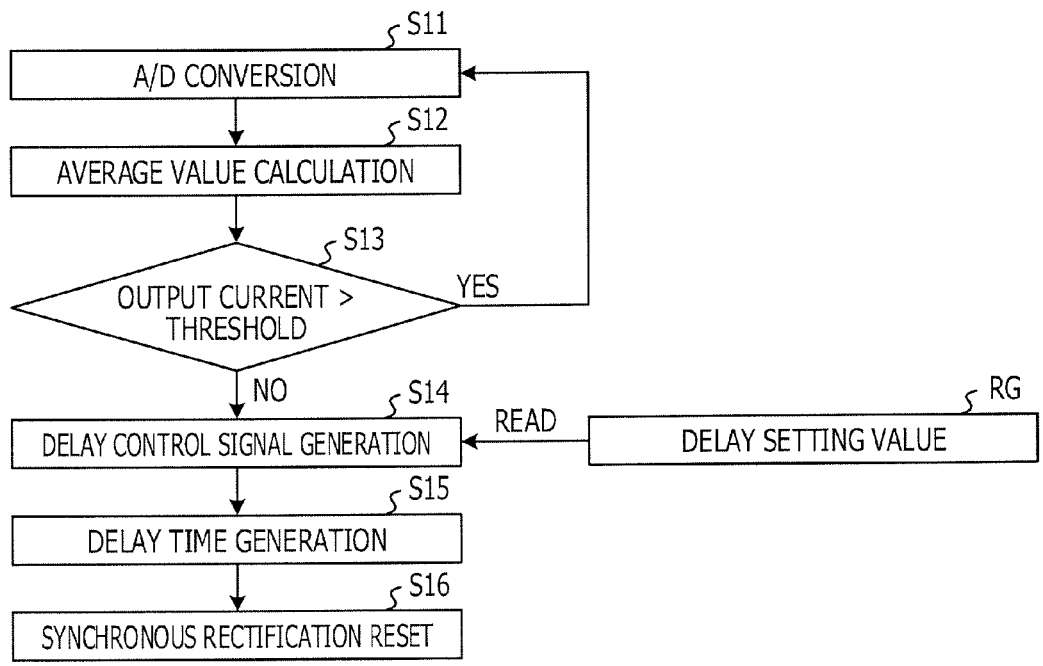
FIG. 15 is a flow chart illustrating a sequence of digital processing.

FIG. 15 is a flow chart illustrating a sequence of the digital processing described above.

In Step S11, the A/D converter 60 performs A/D conversion of an output current.

In Step S12, averaging processing of a digital output current is performed and an averaged output current is calculated.

In Step S13, whether or not the averaged output current exceeds a threshold is determined, if the output current exceeds the threshold, the process returns to Step S11 because delay of an inversion signal is performed with a fixed value and, if the output current is equal to or lower than the threshold, the process proceeds to Step S14.

In Step S14, a delay setting value is read from a delay setting value register RG.

In Step S15, a delay time from the time when an inversion current is detected is generated.

In Step S16, synchronous rectification reset processing is performed based on the generated delay time, and SW2 is turned off.

Next, preferable characteristics of the A/D converter 60 used in the second embodiment will be described.

It is desirable that the A/D converter 60 that detects an output current is configured so as to immediately detect change of the output current. As for the maximum change amount of the output current, di/dt is defined as a specification of a normal power source. For this di/dt, in order to detect a change amount, a sampling frequency which is twice that of a frequency component 1/dt indicated by di/dt is used. The frequency in this case is 1/dt. Herein, dt is a time when the output current changes at a maximum.

Also, for a component having a frequency equal to or higher than a switching frequency $f_{SW}$ included in the output current, control for the load abruptly change responsiveness is not used, and therefore, the frequency is equal to or lower than the switching frequency $f_{SW}$.

Based on the foregoing, the sampling frequency $F_{sample}$ of the A/D converter 60 is as follows.

$$1/dt \leq F_{sample} \leq f_{SW}$$

Embodiments have been described above, but it is needless to say that various modifications are possible. For example, each of the circuits described herein is merely an example, and any circuit which may realize a similar function may be used.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A synchronous rectification converter comprising:
    an inductor;
    a first switching element coupled between one end of the inductor and one end of an input terminal;
    a second switching element coupled between the one end of the inductor and the other end of the input terminal;
    a capacitive element coupled between the other end of the inductor and the other end of the input terminal;
    a control circuit that detects voltages of the inductor and the capacitive element and outputs a control signal that makes the first switching element and the second switching element alternately conductive, based on the detected voltages;
    a current inversion detection circuit that detects inversion of a direction in which a current supplied from the second switching element to the inductor flows and outputs an inversion signal;
    a delay circuit that delays the inversion signal and outputs a delay inversion signal;
    a synchronous rectification reset circuit that changes the control signal in accordance with the delay inversion signal such that the second switching element is turned off;
    a load detector that detects reduction of an output current supplied from a connection node of the inductor and the capacitive element to a load and outputs an output current reduction signal; and
    a delay control circuit that generates a delay control signal a value of which gradually reduces from a time when the output current reduction detection signal is generated,
    wherein the delay circuit changes a delay time of the delay inversion signal in accordance with the value of the delay control signal.

2. The synchronous rectification converter according to claim 1, further comprising:
    a digital signal processor (DSP),
    wherein the control circuit, the delay circuit, the synchronous rectification reset circuit, and the delay control circuit are included in the digital signal processor (DSP).

3. A method for controlling a synchronous rectification converter including an inductor, a first switching element coupled between one end of the inductor and one end of an input terminal, a second switching element coupled between the one end of the inductor and the other end of the input terminal, and a capacitive element coupled between the other end of the inductor and the other end of the input terminal, a control circuit that detects a voltage of a connection node of the inductor and the capacitive element, and makes the first switching element and the second switching element alternately conductive, based on the detected voltage, the method comprising: detecting inversion of a direction in which a current supplied from the second switching element to the inductor flows; turning off the second switching element after detecting the inversion; detecting reduction of an output current supplied from the connection node of the inductor and the capacitive element to a load; and changing a delay time of a delay inversion signal in accordance with a time when reduction of an output current is detected.

* * * * *